United States Patent [19]

Matsumoto

[11] 4,215,924
[45] Aug. 5, 1980

[54] METHOD TO CONTROL INTRODUCTION OF DIFFRACTED BEAM BY MEANS OF DIFFRACTION ELEMENT

[75] Inventor: Kazuya Matsumoto, Yokohama, Japan

[73] Assignee: Canon Kabushiki Kaisha, Tokyo, Japan

[21] Appl. No.: 947,066

[22] Filed: Sep. 29, 1978

Related U.S. Application Data

[60] Division of Ser. No. 812,778, Jul. 5, 1977, Pat. No. 4,172,646, which is a continuation of Ser. No. 422,337, Dec. 6, 1973, abandoned.

[30] Foreign Application Priority Data

Dec. 11, 1972 [JP] Japan .................. 47-124196
Nov. 29, 1973 [JP] Japan .................. 48-134782

[51] Int. Cl.² .............................. G03B 1/00
[52] U.S. Cl. .................. 354/59; 350/96.19; 354/55; 354/56; 355/1
[58] Field of Search .................. 354/59, 54, 55, 56, 354/42, 49; 350/96.19; 355/1

[56] References Cited

U.S. PATENT DOCUMENTS 3,458,702  7/1969  Dryden .................. 354/59 X

*Primary Examiner*—Richard A. Wintercorn
*Attorney, Agent, or Firm*—Toren, McGeady and Stanger

[57] ABSTRACT

According to the present invention in the image forming light path a direction-selective diffraction element is provided in such a manner that the image forming beam having entered into said diffraction element is diffracted by means of the diffraction grating structure of said diffraction element and devided into a plurality of beams, whereby at least one of the diffracted beams is led to a photo detecting device while the not diffracted beam is made use of as the image forming beam.

19 Claims, 30 Drawing Figures

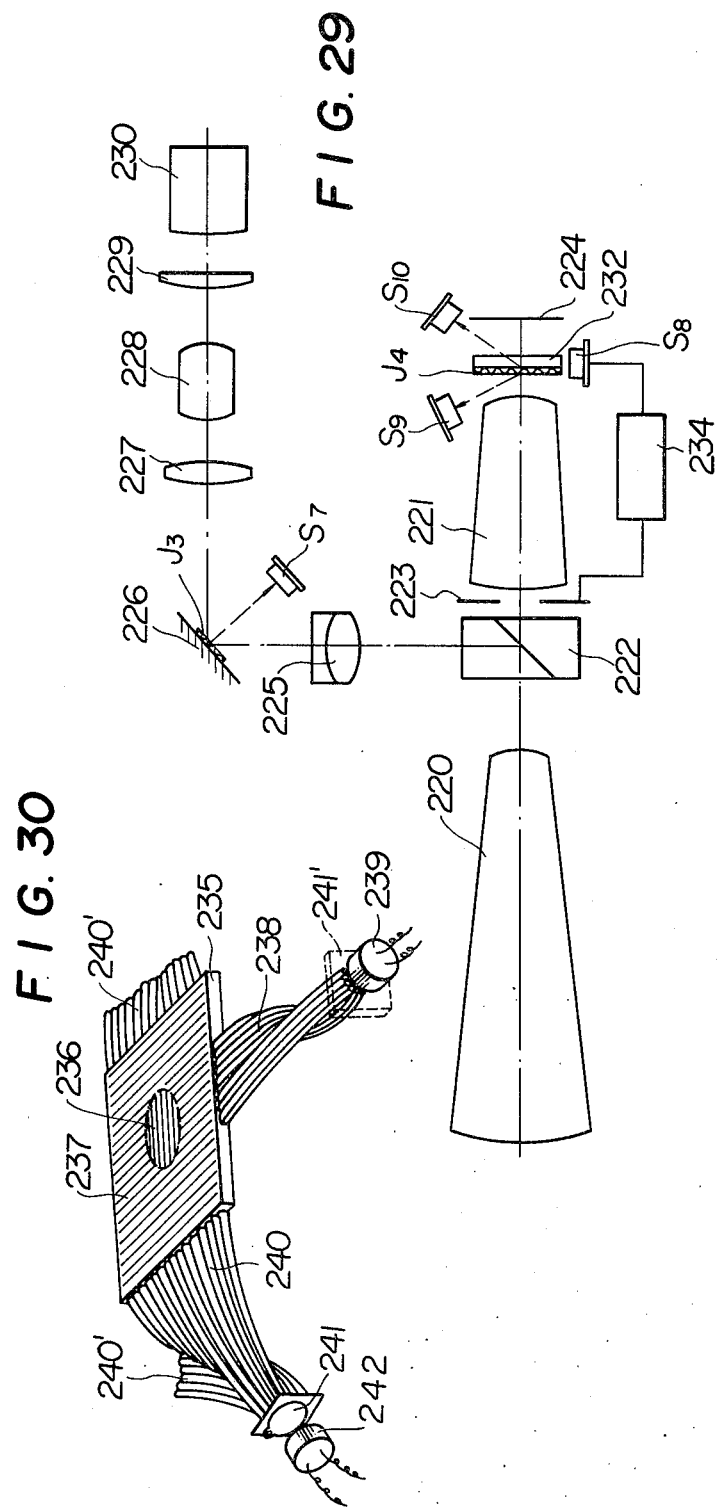

METHOD TO CONTROL INTRODUCTION OF DIFFRACTED BEAM BY MEANS OF DIFFRACTION ELEMENT

This is a division of application Ser. No. 812,778, filed July 5, 1977, now U.S. Pat. No. 4,172,646, issued Oct. 30, 1979, which in turn is a continuation of Ser. No. 422,337, filed Dec. 6, 1973, now abandoned.

BACKGROUND OF INVENTION

The present invention relates to dividing light into two or more beams so that the beams may be used for a different purpose such as forming an image and measuring the light.

It has already been known to perform light measurement by extracting a part of an information bearing image forming beam with a half-mirror or a perforated mirror. At times the surface of a transparent solid body has been provided with a small prism to retract a part of beam.

However it is inevitable that the image formed is darkened considerably by installation of a perforated mirror in the image forming beam. Further to install a mirror obliquely in the image forming beam requires much space. Such space is limited inside of an optical instrument.

On the other hand it is inevitable to produce a bad influence of the image forming ability to install a transparent solid body having a small prism in the image forming light flux.

Further in order that the light measurement might be carried out at the same time at several parts of the image forming beam or that the light measurement might be carried out at certain determined important parts of the beam, the manufacture of the light deviding means has been extremely difficult.

OUTLINE OF INVENTION

The first purpose of the present invention is to offer a means to devide and lead a beam, whereby no bad influence is given to the image forming ability while only a small space is needed for installation.

The second purpose of the present invention is to offer a means to lead at least one beam diffracted by means of a diffraction grating structure along a certain determined direction into a photo detecting means.

The third purpose of the present invention is to make the devided beams maintain a convergent or a divergent effect. The fourth purpose is to devide an image forming beam into a plural number of beams by means of beam deviding means installed in a plural number of devided spaces and to lead the devided beams into a plural number of photo detecting means independent of each other. The fifth purpose is to select a beam having entered into the beam deviding means at a certain determined incident angle out of image forming beams and to lead the selected beam into a photo detecting means. Further the sixth purpose is to alter the beam deviding ratio or to let the beam deviding ratio have an optional distribution by locating the beam deviding means at different spots. Further the seventh purpose is to make the diffraction angle of the diffraction grating serving as a beam deviding means fulfill the condition of total reflection at the boundary surface of a material into which the diffracted beam enters and which presents a different index of refraction. The eighth purpose is to lead the diffracted beam totally refrected to the photo detecting means.

Further the nineth purpose is to install the direction selective diffraction element serving as a beam deviding means in the optical system of a photographic camera effectively.

EXPLANATION OF DRAWINGS

FIGS. 28 and 29 respectively show a disposition applied in a cinecamera according to the present invention.

FIG. 30 shows one embodiment in which an element combining a light transmitting member and a diffraction grating structure is used to effect light measuring in the center portion and the circumferential portion of the picture.

Figure 1:
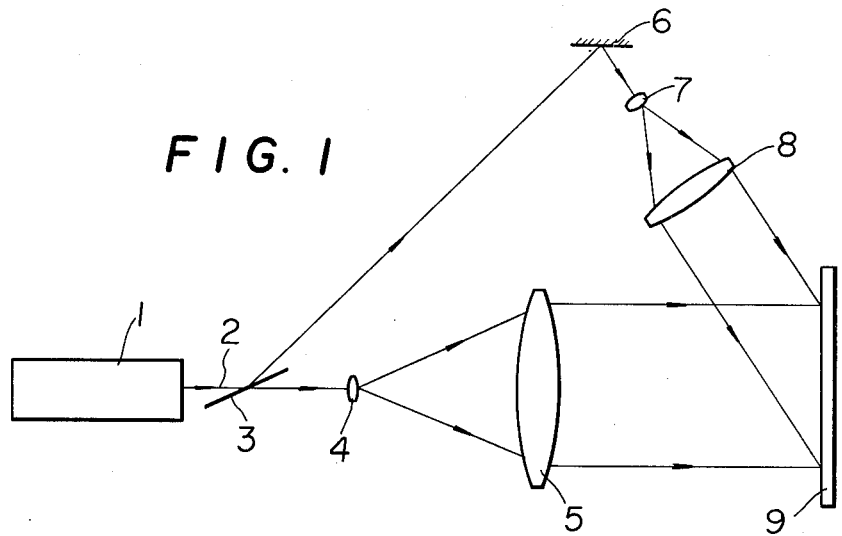
FIG. 1 shows a process to produce a diffraction element according to the present invention.

First of all a process to produce holographically a direction selective diffraction element to be applied in the present invention will be explained below according to FIG. 1, whereby it is to be noted that the process itself belongs to an already known technics.

The beam 2 emitted from a laser 1 is divided into two beams by means of a beam splitter 3, a mirror 6 and respective pairs of lenses 4,5 and 7,8 direct the beams toward the surface of a photosensitive material 9. On the surface of the photosensitive material 9 an interference fringe is produced with both of the beams, which interference fringe is recorded photographically on the photosensitive material. The photosensitive material on which the interference fringe is photographically recorded is the so called hologram and serves as one of the direction selective diffraction elements mentioned in the present specification.

Figure 2:
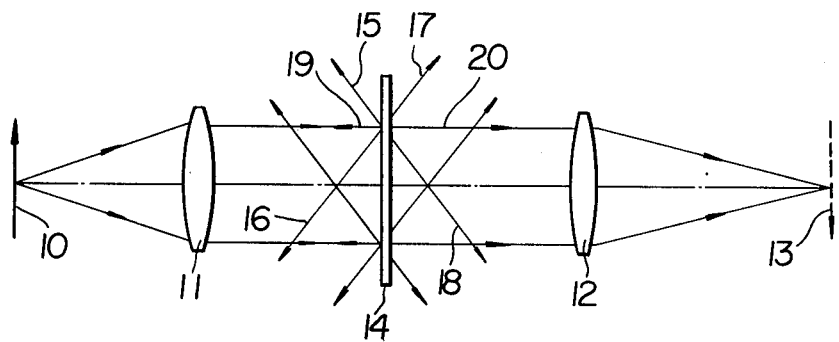
FIG. 2 shows a disposition of the diffraction element in the image forming beam.

A process to lead a beam composing a foundation of the present invention will be explained below according to a direction selective element obtainable according to the above mentioned process as one example. In FIG. 2 light is reflected by an object 10. An image forming optical system composed of lenses 11 and 12 forms an image 13 of the object 10. A direction selective element 14 obtained according to the process shown in FIG. 1 is disposed in the image forming beam in the optical system 11, 12. The element 14 produces reflected diffracted beams 15 and 16 as well as penetrating diffracted beams 16 and 17. It also produces a reflected nondiffracted beam 19 as well as a penetrating non-diffracted beam (diffracted beam with o-th order) 20.

If the light beam illuminating the object 10 is white, the image formed with the above mentioned diffracted beams become color "disturbed", while the image formed with the non-diffracted beam is not. Therefore it is possible to measure the brightness of the beam emitted from an object, by making use of the non-diffracted beam as image forming beam and by receiving the diffracted beam with a photo detecting means.

It is desirable that the holographic direction selective diffraction element be clear. For purpose the hologram of silver salt photosensitive material is bleached or a transparent non silver salt photosensitive material is utilized. Example of a transparent non silver salt photosensitive material are photoresist, photopolymer or photothermoplastics.

However the direction selective diffraction element is not necessarily limited to a hologram. An already known diffraction grating can also be utilized. According to an embodiment of the invention the interval between the adjacent lattices is small enough so that the diffracted beam of above the second order could not fulfill the diffraction condition and only the diffracted beams of the ± first order can be diffracted.

Although until now the hologram of plane type by means of which a number of diffracted beams are produced is explained, while it is also possible to adopt a photosensitive material with the photosensitive portion about 5 μm up to 50 μm thick so that only one diffracted beam can be produced. Therefore an effective diffraction can be obtained by disposing a hologram of three dimentional structure as mentioned above.

In case further in FIG. 2 a reflected non-diffracted beam is utilized as image forming beam, it is recommended that a holographic photosensitive material of relief type should be used, whereby the hologram is produced with the unevenness of the surface of the photosensitive material, by treating the surface with beam reflecting film by means of for example al-deposition.

Although according to the present invention such a direction selective diffraction element as mentioned above is disposed either in the image forming beam path or on the surface of other optical member provided in the beam path in such a manner that the beam diffracted by means of the element is led to a photosensitive means, other subsidery purposes of the present invention will be explained below respectively in order to make the present invention understood more clearly.

First of all the importance of the fifth purpose of the present invention to give a certain determined tendency to the wave surface of the diffracted beam will be explained below in comparison with the already known technics.

Figure 3:
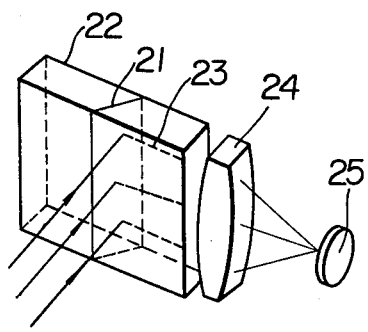
FIG. 3 and FIG. 4 respectively show an already known beam deviding means.

What is shown in FIG. 3 is an already known light measuring means in which the beam is devided by means of a half transparent mirror. In case as is shown in the drawing the light receiving surface of the photo cell 25 is small, it is necessary to condense the devided beam, whereby the beam 23 devided by the half transparent mirror 21 of the light deviding member 22 is condensed on the light receiving surface of the photo cell 25 by means of a condenser lens or a cylindrical lens.

Figure 4:
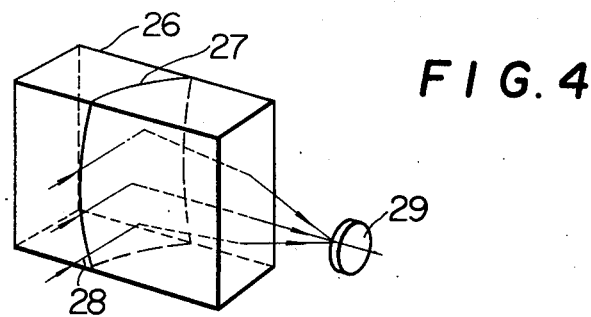

Further what is shown in FIG. 4 is an improvement of the light measuring means shown in FIG. 3, whereby inside of the optical member 26 an inclined spherical half transparent surface 27 is disposed so as to devide the image forming beam 28 and to condense the devided beam on the light receiving surface of the photo cell 29. However the means so far mentioned are short of compactness, whereby in the latter case the manufacture is extremely difficult.

Figure 5:
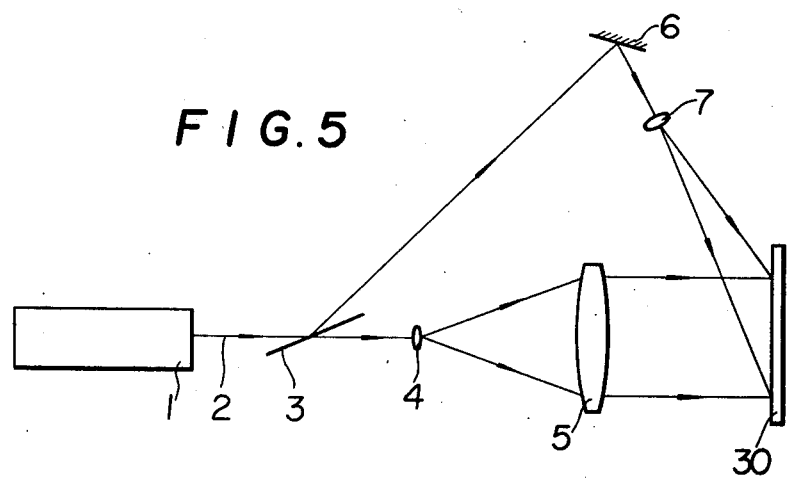
FIG. 5 shows a process to produce another diffraction element according to the present invention.

According to the present invention a certain determined tendency for example a light condensing effect to the beam diffracted by means of a direction relective diffracting element, whose production process is shown in FIG. 5, whereby it is to be noted that the production process itself is an already known technics.

Figure 6:
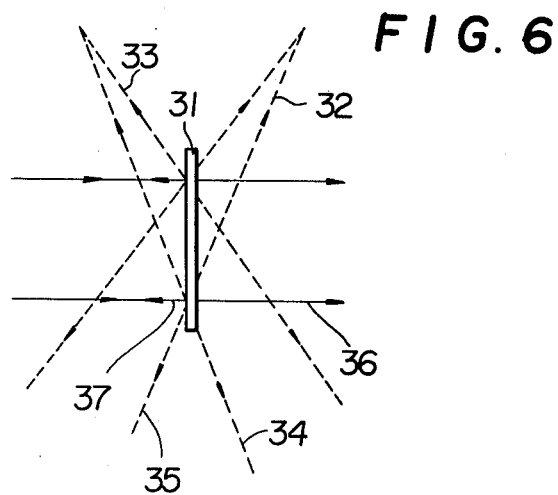
FIG. 6 shows a disposition of the diffraction element in the image forming beam.

A beam emitted from a laser 1 is devided into two beams by means of a beam splitter 3, whereby the one beam is made to diverge and converted into a parallel beam by means of the lenses 4 and 5, while the other beam is reflected by means of a reflection mirror to be led into a small lens which makes the beam diverge in such a manner that both beams are directed toward the photosensitive material. Hereby both beams form an excentric concentric interference fringe, which fringe is recorded photographically. In case the diffraction element produced in this way is disposed in the image forming beam path as shown in FIG. 2, as shown in FIG. 6 by means of the element convergent diffracted beams 32 and 33 as well as divergent diffracted beams 34 and 35 are produced. In this case the non diffracted beam 36 or 37 is free from any disadvantageous influence of the element 31.

If therefore at the focal point of the divergent beam 32 or 33 a photo cell is disposed, it is possible to carry out light measurement even if the light receiving area of the photo cell is small.

Even if further the light receiving portion of the photo cell is not spherical, it is possible to give the beam entering into the photo cell a form corresponding to that of the cell.

In case for example the light receiving portion of the photo cell is slender, it is possible to condense a beam in form of a line by means of a hologram as diffraction element produced by making one beam with parallel wave surface interfer with another one with cylindrical wave surface.

In case further the light receiving portion is ring shaped, it is possible to produce a hologram for this purpose by emitting a beam with spherical wave surface from a ring shaped part.

Below the importance of the fourth purpose of the present invention according to which the image forming beam is devided by a diffraction element devided in a plural number of spaces in such a manner that respective beams are led into respective photo cells corresponding to the beams will be explained.

Figure 7:
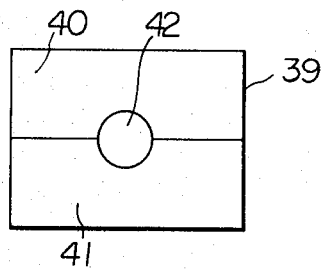
FIG. 7 shows a state in which the image forming beam is devided.

FIG. 7 shows a section of an image forming beam for example at the focal plane of the camera finder, whereby it is desired to carry out light measurement at the parts 40 and 41 composing a whole image plane and at the central part 42 independently of each other.

Figure 8:
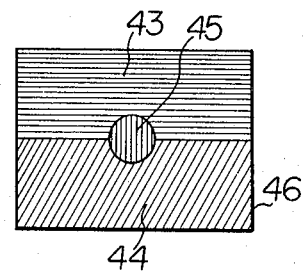
FIG. 8 shows a plane figure of further another diffraction element according to the present invention.

In such a case the diffraction element for the purpose can be produced by means of the process explained according to FIG. 5. At first in front of the photosensitive material 30 shown in FIG. 5 a mask having a cutting of corresponding shape is placed and a hologram is photographed. Then another mask having a cutting at a different part is placed on the same photosensitive material 30, the photosensitive material together with the mask is rotated by a certain determined angle around the optical axis as center and then the second photograph is taken. In this way photographs are taken on the same photosensitive material in such a manner that finally a hologram 46 as shown in FIG. 8 is obtained. On this hologram namely the diffraction element 46 interference fringes 43, 44 and 45 with different inclinations from each other are recorded.

Figure 9:
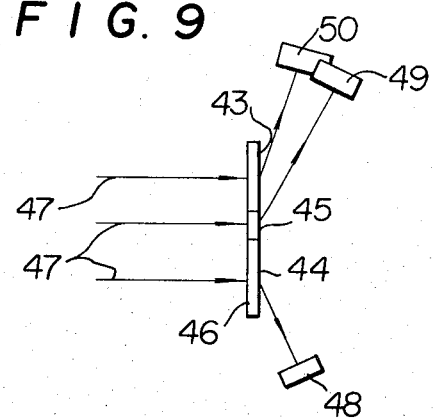
FIG. 9 shows the diffraction element disposed in the image forming beam.

In case now the diffraction element 46 is disposed in the image forming beam 47 as shown in FIG. 9, the beams diffracted by the parts 43, 44 and 45 composing the diffraction element 46 are condensed at different positions from each other in a space. Thus it has become possible to detect the light quantity at each position independently of each other by disposing photo cells 48, 49 and 50 at each light condensing position. Further it is possible to devide the diffracted beam by means of a hologram produced, altering the incidence direction of beam one after another.

Next the importance of the fifth purpose of the present invention according to which a certain determined part of the image forming beam is selected will be explained below.

In case for example the light is measured in the finder system of a camera, it is often desired that the light measurement should be carried out rather at the central part than at the part near circumference of the finder beam. This kind of light measurement is generally called partial light measurement, whereby in case of an already known technics in the neighbourhood of the eye piece of the camera finder a lens is disposed in such a manner that the beam near the center of the focal plane is focussed on the light receiving surface of a photo cell to measure the light, so that the optical system to fulfill this purpose is much complicated.

Figure 10:
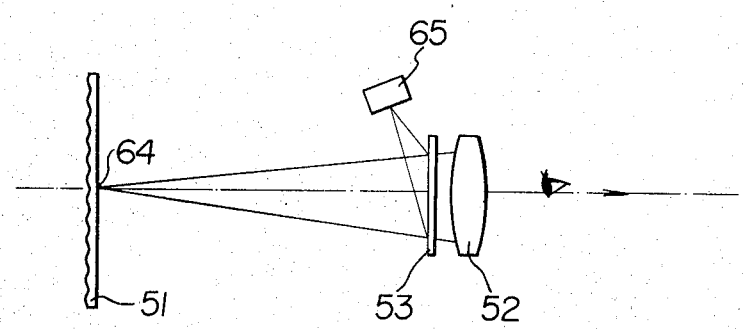
FIG. 10 shows further another diffraction element carrying out a light measurement according to the present invention.

On the other hand by means of the direction selective diffracting element according to the present invention, the disposition is as shown in FIG. 10. The focal plane 51 is disposed in the finder beam, while 53 is a diffraction element for selective light measurement produced according to a process to be explained later. 52 is the eye piece and 55 a photo cell. In the present case the beam coming from the spot 54 on the focal plane 51 element 53 and led into the photo cell 55, while the beam coming from the part near the circumference of the focal plane 51 is diffracted less efficiently in such a manner the beam led into the photo cell is reduced, so that a selective light measurement can be carried out.

Figure 11:
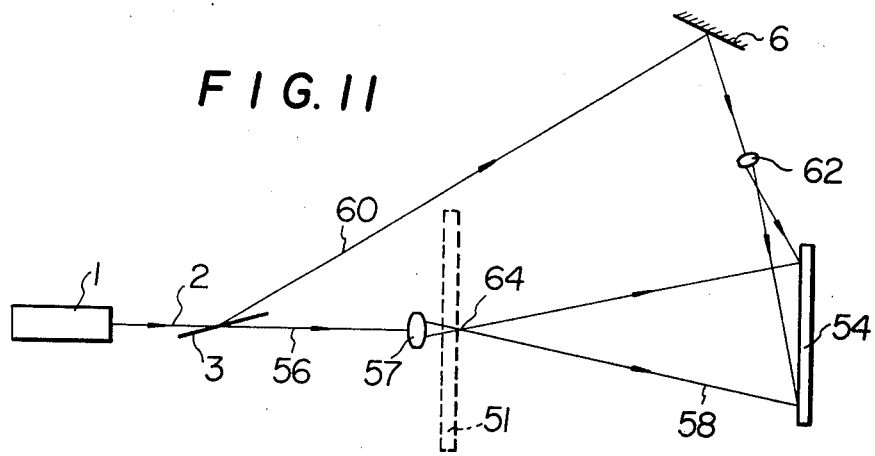
FIG. 11 shows the process to produce the diffraction element.

Below a process to produce a diffraction element for selective light measurement will be explained. In FIG. 11, 63 is the photosensitive material which is disposed at the position corresponding to that of the element 53 shown in FIG. 10. Further at the position 64 which corresponds to the point 54 on the focal plane 51 in FIG. 10 and at which it is desired to carry out a selective light measurement, a coherent beam is focussed by means of the lens 57, whereby after the position 64 the beam is let diverge and led to the photosensitive material 63. On the other hand another wherent beam separated by means of the beam splitter is led as a divergent beam to the photosensitive material 63 by means of a mirror 6 and a lens 62. At interference fringe produced with the interference of these two coherent beams is recorded on a photosensitive 100 m$\mu$ thick so as to produce a hologram. Thus produced hologram is the one of three dimentional type, whose direction selectiveness is very sharp. Hereby it is to be noted that the beam to be led into the photosensitive material by means of the lens 62 is not necessarily to be limited to a divergent beam as mentioned above but can be any beam with wave surface of any shape.

Further the fifth purpose of the present invention to lead a beam with a certain determined incidence angle out of the image forming beams can be realized by producing a hologram, selecting a shape of the beam 58 shown for example in FIG. 11 properly.

Figure 12:
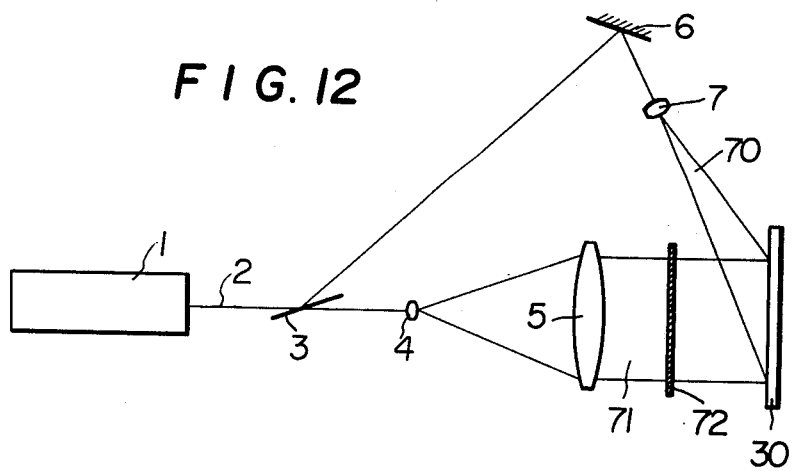
FIG. 12 shows the process to produce further another diffraction element according to the present invention.
Figure 13:
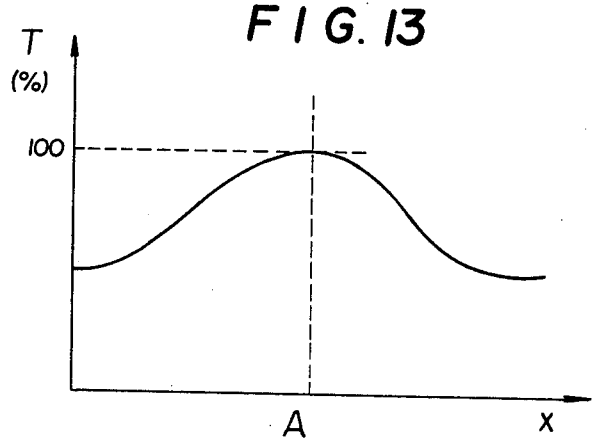
FIG. 13 is a diagram showing a distribution curve of the penetrating power of a filter to be used for producing a diffraction element.

The sixth purpose of the present invention according to which the intensity of the beam diffracted by the diffracting element presents an optional distribution on the surface of the element is explained below. It is possible to carry out a selective light measurement as explained above with such an element as is disposed on the focal plane of the camera finder. The process to produce a diffraction element with such properties will be explained below. FIG. 12 shows an optical disposition similar to that of FIG. 5, whereby the intensity of the beam 70 and that of the beam 71 is equal to each other to produce interference fringe on the photosensitive material 30. Hereby in the one beam 71 a filter 72 is disposed, whereby the filter 72 presents a distribution of penetration power as is shown in FIG. 13.

A hologram produced by means of such a filter 72 presents a maximum contrast in the interference fringe produced by the beam having passed the neighbourhood of the spot A with the highest penetration power of the filter and the more distant it is from the spot, the lower the contrast is.

In cast therefore a thus produced diffracting element is disposed in the image forming beam, the part corresponding to the neighbourhood of the spot A produces a diffracted beam most efficiently, while the more distant it is from the spot, the lower the efficiency of the beam devision becomes so that a selective light measurement similar to the above can also be carried out.

Although in the present case a filter is disposed in the one beam to alter the contrast of the interference fringe, it is sufficient to alter the contrast of the interference fringe in short.

What is so far stated relates principally to the case that the beam diffracted from the diffraction grating structure is condensed directly on the photosensitive means. However it is also possible to lead the diffracted beam to the phtosensitive means through a light transmitting member.

Below the seventh and the eighth purpose of the present invention will be explained making reference to the introduction of a beam diffracted by a diffraction element into a beam transmitting member, particularly a member transmitting beam by total reflection. Further it is also important to take out a beam transmitted through the means by total reflection from the member and introduce the beam into a photo cell, so that the above mentioned case is also explained.

Figure 14:
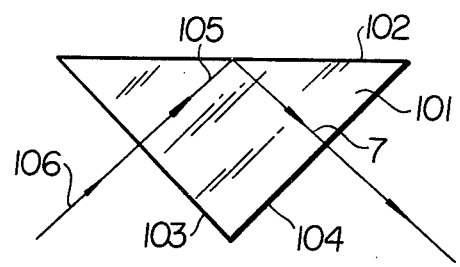
FIG. 14 shows an already known technics to lead a beam to the totally reflecting surface.

Until now there have been many optical instruments in which a total reflection taking place at the end surface of a prism is made use of, whereby an already known technics as shown in FIG. 14 has been adopted to introduce a beam into a prism so as to cause a total reflection or to take out a beam totally reflected in the prism from the prism.

Namely a beam fulfilling the total reflection conditions enters into a surface 102 causing a total reflection of the prism 101, whereby the incidence surface 103 as well as the exit surface 104 of the beam is induced with reference to the surface 102.

Figure 15:
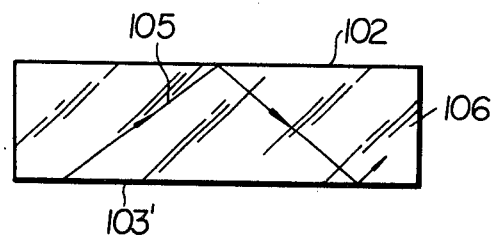
FIG. 15 shows the beam propagation in case of total reflection.

If therefore likely to the surface 103' in FIG. 15 the incidence surface or the exit surface is disposed parallel to the totally reflecting surface, the beam 105 fulfilling the total reflection condition on the surface 102, namely the incidence beam from the outside of the prism, fulfills the total reflection condition on the boundary surface 103' between the outside and the prism 106, so that the beam can not enter into the prism 106, while for example a beam not fulfilling the total reflection condition on the surface 103' and entering into the prism penetrates reflecting the prism 106, never to be totally reflected on the surface 102. Further the beam 105 totally reflected on the surface 102 is also totally reflected on the surface 103', never to be thrown out of the prism 106.

The present embodiment is characterized in that by providing a surface serving as the incidence surface or the exit surface of an optical member with a diffracted grating structure in such a manner that the beam diffraction thereby is totally reflected, it is not always, as according to the conventional process, necessary to incline the incidence surface and the exit surface with reference to the totally reflecting surface, whereby a beam fulfilling the total reflection condition can be led into the optical member respectively thrown out of the optical member without any application of other auxiliary optical member in order escape from the total reflection condition.

Figure 16:
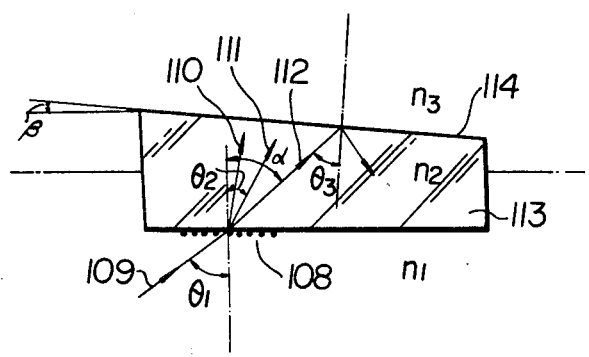
FIG. 16 shows an embodiment of the present invention.

The principle of the present invention will be explained below according to FIG. 16.

In the drawing 113 is a prism, 114 a totally reflecting surface, 108 the surface of a prism presenting a diffraction grating structure, 109 a beam entering intothe prism from outside, 110 a diffracted beam of $-1$ at order, 111 a diffracted beam of 0-th order and 112 a diffracted beam of $+1$ st order. The beam 109 having entered into the surface 108 of the prism presenting a diffraction grating structure is diffracted and devided into three beams, namely a diffracted beam 110 with $-1$ st order, a diffracted beam 111 with 0-th order and a diffracted beam 112 with $+1$ st order. Hereby the direction of the diffracted beam 111 with 0-th order is given by the following equation:

$$\theta_2 = \sin^{-1}(\frac{n_1}{n_2} \sin \theta_1) \tag{1}$$

while those of the diffracted beam with $\pm 1$ st order are given by the following equation:

$$\alpha\pm = \theta_2 \pm \sin^{-1}(\lambda/n_2 p) \tag{2}$$

Hereby $n_1$ is the index of refraction of the means in which the incident beam 109 propagates while $n_2$ that of the prism means. Further $\theta_1$ is the incident angle of the beam 9, $\theta_2$ the angle of refraction of the diffracted beam with 0-th order, $\lambda$ the wave length of the beam 9, P the pitch of the diffraction grating and $\alpha + 1$ the direction of the beam with $-1$ st order while $\alpha - 1$ is that of the beam with $+1$st order.

The diffracted beam 112 with $+1$st order enters into the totally reflecting surface 114 at an angle $\theta_3$ given by the following equation, whereby $\beta$ is the inclination of the surface 114 toward the surface 108.

$$\theta_3 = \alpha_+ - \beta \tag{3}$$

The total reflection condition of the beam 112 on the surface 114 is given as follows, whereby $n_2$ is greater than $n_3$ ($n_2 > n_3$).

$$\theta_3 > \sin^{-1}(n_3/n_2) \tag{4}$$

Hereby further $n_3$ is the index of refraction of the means outside of the prism.

The equation (4) can be converted as follows by means of the equation (1), (2) and (3).

$$\sin^{-1}(\frac{n_1}{n_2} \sin \theta_1) + \sin(\frac{\lambda}{n_2 p}) - \beta > \sin^{-1}(\frac{n_3}{n_2}) \tag{5}$$

If therefore the indexes of refraction of the means $n_1$, $n_2$ and $n_3$, the pitch p of the diffraction grating, the incidence angle $\theta_1$ to the prism of the inclination $\beta$ are chosen properly, it is possible to lead the beam 9 into the totally reflectig surface 14 of the prism from outside.

In case for example the prism consists of parallel plates and the incidence angle of the beam is right angle, namely $\theta_1 = 0$ and $\beta = 0$, the following condition is given by the equation (5).

$$p < \lambda/n_3 \tag{6}$$

Therefore in the present case it is possible lead the beam into the prism by means of a diffraction grating fulfilling the condition given by the equation (6).

In case for example $\theta_1 = 45°$, $\beta = 0$, $n_1 = n_3 = 1$, $n_2 = 1.5$ and $\lambda = 5000$ Å, p is smaller than 144 μm. Therefore it is possible to lead into the inside of the parallel plane plates from outside a beam which otherwise might be totally reflected on the surface by providing the incidence plate of the parallel plane plates with a diffraction grating structure of about 1 μm.

Because hereby the diffraction grating mentioned above is of plane structure, the diffracted beam with 0-th order is the largest in quantity, while it is desired that the diffracted beams with $\pm 1$ order should be the largest in order that the light quantity of the incidence beams might be made use of most efficiently, for which purpose it is recommended to adapt the diffracting grating of three dimensional structure.

Figure 17:
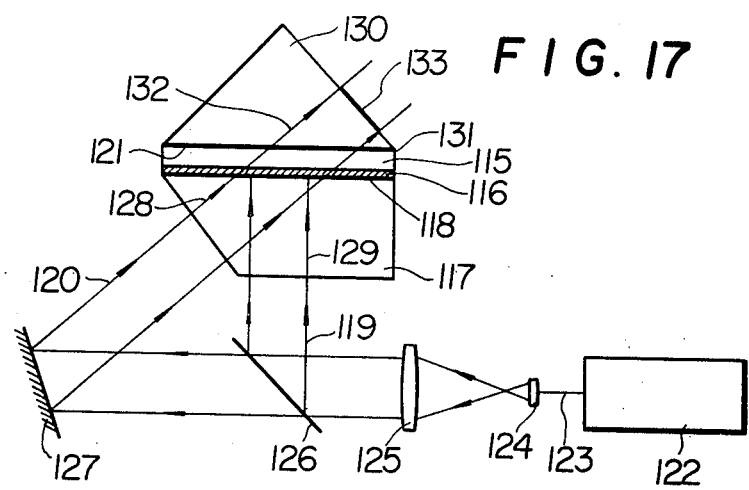
FIG. 17 shows a process to produce a totally reflecting member according to the present invention.

FIG. 17 shows an embodiment of the process to produce diffraction grating of three dimensional structure as mentioned above. In the drawing 115 is a totalling reflecting member provided with diffraction grating, 116 a photosensitive layer, 117 an auxiliary prism to produce diffraction grating, 118 a material such as liquid presenting an index of refraction similar to that of the totally reflecting member and of the auxiliary prism. 122 is a laser generator, 130 the second auxiliary prism. As is shown in the drawing on the one surface of the totally reflecting means 15 a photosensitive layer 116, close to which layer a prism 117 is disposed. Hereby an optically close contact can be obtained by bringing the totally reflecting means 115 in contact with the prism 117 by means of the liquid whose index of reflection is similar to that of both of the above means. By means of the above disposition two mutually coherent beams 119 and 120 are projected into the prism 117. The one 120 of the above beams is led to the totally reflecting surface 121 of the totally reflecting means 115, whereby the beam 120 is introduced into the prism in such a manner and at such an angle that the totally reflecting surface 121 fulfills the totally reflecting condition in case the surface lies in contact with the outer means such as air. Hereby the two coherent beams 119 and 120 are produced in such a member that the beams 123 emitted from the laser 122 is made to diverge by means of a lens system consisting of the lenses 124, 125, divided into two beams by means of the beam splitter 126 and reflected by means of the reflector 127. The beams 128 and 129 having entered into the prism 117 reaches the photosensitive layer 116, in which layer a three dimensional interference fringe 135 is produced as shown in FIG. 18.

After developing the photosensitive layer, a totally reflecting means 115 presenting a three dimensional diffraction grating structure is obtained. The beam 128 totally reflected on the totally reflecting surface 121 during the production reaches again the photosensitive layer as harmful beam. In order to avoid this, the totally reflecting surface 121 is treated with a paint prohibiting total reflection, or as is shown in FIG. 17 the second auxiliary prism 130 is brought in contact with the totally reflecting surface 115 by means of a liquid 131 is such a manner that the beam 132 having entered into the second auxiliary prism 130 is absorbed by the painted laid on the surface 133 of the prism 130, whereby the surface 133 can be treated with the reflection prohibiting coating in such a manner that the beam is led out of the prism 130.

Figure 18:
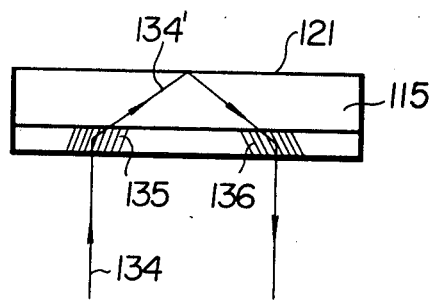
FIG. 18 shows an application of the totally reflecting member.

By means of thus produced total reflecting means 115 as is shown in FIG. 18, a diffracted beam 134' along an almost same direction as the beam 128 can be obtained, when the beam 134 is projected along an almost same direction as the beam 119 in FIG. 17, whereby the beam 134' is totally reflected on the surface 121. In the present case the diffraction grating 136 presents a three dimensional structure so that the quantity of the projected beam 134 is almost transmitted along the direction of the straight propaging diffracted beam with O-th order and of the diffracted beam 134' with + 1-st order and very little along the direction of the diffracted beam with − 1-st order. Thus the reduction of the beam quantity can be avoided.

Further it is possible to take the beam out of the totally reflecting means for example by disposing a diffraction grating 135 of three dimensional structure and another diffraction grating 136 also of three dimensional structure but symmetrical to that of the diffraction grating form this kind of diffraction grating the layer of above mentioned kind of structure is recommended and as material for example photoresist, photopolymer and so on are pointed out.

By means of the above mentioned means it is made possible to project a beam into a medium, even when the projection angle fulfills the total reflection angle, in such a manner that the desired refraction angle after projection can be obtained, when the beam travels between two mediums with different indexes of refraction.

The application of an embodiment will be explained below in comparison with the already known technics.

Figure 19:
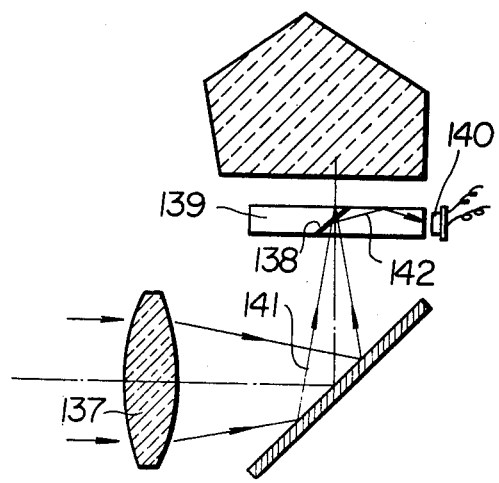
FIG. 19 shows the optical system of an already known single reflex photographic camera.

FIG. 19 shows an optical system of a conventional reflex camera, by means of which a part of the beam is led to the light receiving element to measure the light quantity. In the drawing 137 is a photographing lens system, 139 a glass plate presenting a beam splitter 138 in its inside, 144 a light receiving element, whereby a part of the beam 141 coming from the object and passing through the lens system is reflected by means of the beam splitter 138 into a beam 142, which beam is totally reflected on both surfaces of the glass plate 139, lead into the photo cell 140 which measures the light quantity. Instead of the glass plate 139, a totally reflecting means presenting a diffraction grating structure on the one surface of the parallel plane glass can be utilized.

In case of the beam 141 a parallel plane glass presenting a diffraction grating structure on one surface such as the totally reflecting member shown in FIG. 18, a part of the projected beam is diffracted as the diffracted beam with +1-st order, totally reflected on both surfaces of the plane glass and led to the photo cell 140, while the straight advancing diffracted beam with 0-th oder forms a finder image.

Hereby by disposing a diffusion screen under the totally reflecting members 115, the dependency of the beam diffracted by the diffraction grating structure upon the variations of the iris aperture in lenses as well as the influence by the spectrographical diffraction characteristic can be improved.

When further the totally reflecting member 115 is used as the light measuring glass plate of the finder, the coming beams coming from the lens 142 enter into the member at different angles, so that in order to obtain the most efficient total reflection for all beams it is recommended to utilize a beam 129 whose wave form is equal to the spherical wave originating from the center of the exit iris of the image forming lens 137 toward the totally reflecting member, when the totally reflecting member is produced. Further the beam 141 is composed of all colors so that in order to lead all visible beams to the photo cell it is desired that the totally reflecting members 115 is produced in the disposition as shown in FIG. 17 by means of a blue laser beam with short wave length in such a manner that all the beams whose wave length is longer than that of the blue beam.

The merit which can be obtained when the totally reflecting member 115 as mentioned above is applied for light measurement is that according to the area of the part provided the diffraction grating or to the production process any desired light measuring angle and range can be obtained, and that the totally reflecting member can be made very thin because the diffraction grating serves as beam splitter while for the conventional light measuring glass plate as shown in FIG. 19 it is necessary to dispose a beam splitter 138 so that the thickness of the glass plate becomes large. Hereby it is to be noted that the totally reflecting member 15 is shown exaggerated in thickness. When the plane diffraction grating is utilized, the production cost can be reduced considerably in comparison with the conventional ones because the reproduction by means of stamping is possible.

Figure 21:
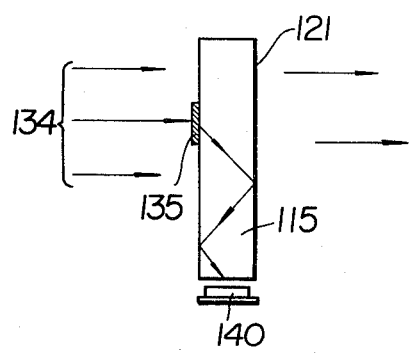
FIG. 21 shows an application of the totally reflecting member.

The so far explained example of disposition relates to the light measurement in the finder optical system, whereby this kind of totally reflecting members can be made use of as light measurement member for general beams. For example as shown in FIG. 21 a totally reflecting member 115 is disposed in the beam 134 in such a manner that a part of the beam is diffracted by means of a diffraction grating 135 provided on the one surface of the totally reflecting member 115, totally reflected by means of both surface of the member and led into the light measurement member 140 for light measurement.

Figure 20:
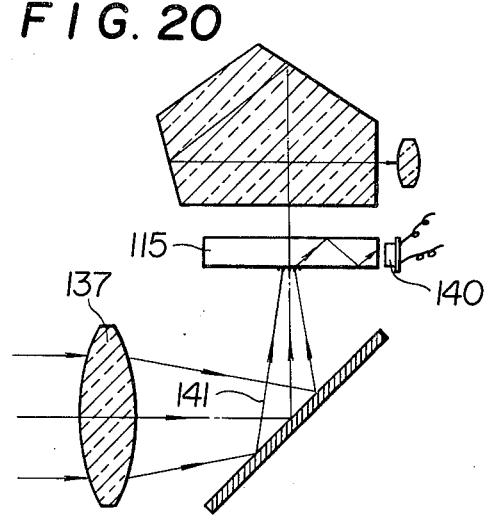
FIG. 20 shows the totally reflecting member in built-in state.
Figure 22:
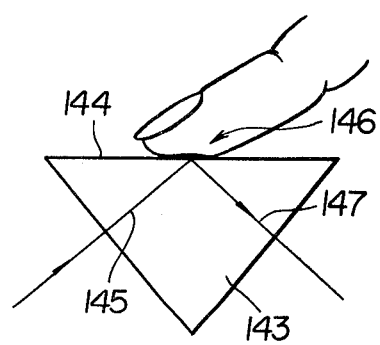
FIG. 22 shows an already known example of the image indication system.
Figure 23:
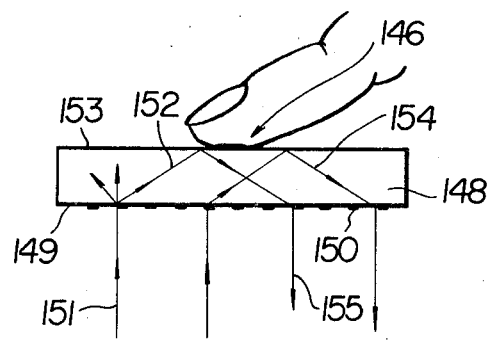
FIG. 23 shows the totally reflecting system in applied state.

Another application of the embodiment will be explained below in comparison with the conventional technics. As a conventional technics it is already known to convert the image information of unevenness in to the information of brightness for indication by absorbing a part of the totally reflected beam. The principle is that as shown in FIG. 22 the projected beam 145 is totally reflected on the one surface 144 of the prism 143 and that the image information body 146 of the distribution of unevenness is brought in contact with the totally reflecting surface whereby the beam oozing from the totally reflected beam in the neighbourhood of the totally reflecting surface is absorbed by the convex parts of the image information body 146 in such a manner that the distribution of unevenness is converted into the distribution of the intensity of the totally reflected beam 147. The mechanism is that as shown in FIG. 20 the projected beam 145 is totally reflected on the one surface 144 of the prism 143 and that with its totally reflecting surface an image information body 146 for example as finger mark is brought into contact whereby the beam oozing from the totally reflected beam in the neighbourhood of the totally reflecting surface is absorbed by the convex parts of the image information body 146 in such a manner that the distribution of unevenness is converted into the distribution of the intensity of the totally reflected beam 147. According to this conventional technics the exit surface of the prism is inclined to the totally reflecting surface 144 in order to lead the totally reflected beam out of the prism 143. Therefor it is inevitable that the image obtained according to this technics should present a distortion due to the effect of the incline surface of the prism itself that the path of each totally reflected beam is different to its length. In case of the present embodiment it is possible to dispose the exit surface parallel to the totally reflecting surface so that it is possible to solve the problem of the image distortion, which is the problem of the conventional technics, by using the present totally reflecting members in place of the totally reflecting prism 143. The example for the above is shown in FIG. 23. When on the one surface 149 of the parallel plane glass plate 143 a plane diffraction grating structure 150 is disposed, into a part of which the beam 153 is projected, the diffracted beam 152 with +1 order is projected on the totally reflecting surface 153 and totally reflected there. The totally reflected beam 154 is projected on the surface 149 again, diffracted by means of the diffracting grating structure 150 existing on the surface and thrown out as the beam 155 from the glass plate.

It becomes possible to convert the image information consisting of the distribution of unevenness into that of the distribution of the intensity of brightness by bring the image information of the distribution of the unevenness in contact with the totally reflecting surface 153. Hereby it is further possible to obtain an image free from distortion because the path of each totally reflected beam is equal in length quite different from the conventional technics by means of prism.

As is clear from the above explanation in case of the present embodiment on one part of the optical member presenting a totally reflecting surface a diffraction grating structure is disposed in such a manner that the wave diffracted by the diffraction grating is a totally reflected beam, whereby different from the conventional prism is made possible to lead a beam, which fulfills the total reflecting condition in the optical member, into the optical member without making the incidence or the exit surface of the totally reflected prism inclined to the totally reflecting surface. Therefore the present embodiment serves much to solve many problems due to the properties peculiar to the conventional optical member making use of totalreflection.

Figure 24:
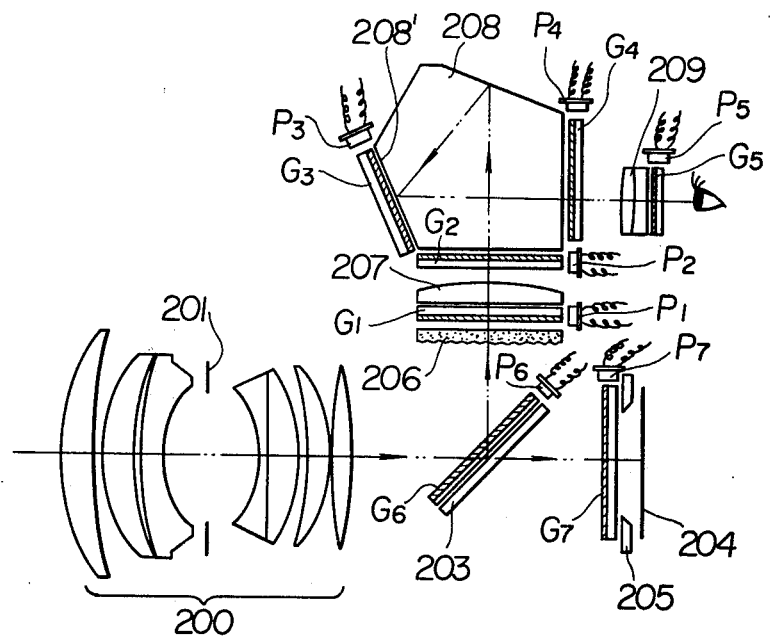
FIG. 24 shows an embodiment of the present invention applied in a single reflex camera.

Below the disposition of the light measurement system of a camera explained according to FIG. 20, namely the ninth purpose of the present invention will be explained. First of all the position of the reflecting member presenting a diffraction grating structure as mentioned above and that of the light receiving element disposed in a single reflex camera is explained. In FIG. 24, 200 is a photographing lens, 201 a diaphragm, 203 a mirror, 204 an image plane, 205 a shutter, 206 a focal plane, 207 a condensor lens, 208 a pentagonal prism and 209 an eye piece. G is the reflecting member presenting the diffraction grating as mentioned above and P the light receiving element.

The member $G_1$ is disposed between the focal plane 206 and the condenser lens 107 and the light receiving member $P_1$ toward the end plane of the member $G_1$. In the present disposition the beam coming from the object passes through the photographing lens 200, is reflected on the mirror and diffused on the focal plane 206. The diffused beam passes through the member $G_1$, when a part of the beam propagate in the member $G_1$ being totally reflected or along the diffraction grating and reaches the light receiving member $P_1$.

In the example of the second disposition between the condensor lens 207 and the pentaprism 208 a member $G_2$ is disposed and the light receiving member case the light measurement is carried out by using a part of the beam having passed through the condensor lens.

In the third disposition the member $G_2$ is disposed in front of the front reflecting plane 208' of the pentaprism and the light receiving member $P_3$ toward the end of the member $G_2$. The beam used for the light measurement here is the beam advancing toward the reflecting plane 208' excepting the finder effective beam. In the fourth disposition the member $G_4$ is disposed between the pentaprism 208 and the eye piece and the light receiving member $P_4$ toward the end of the member $G_4$.

In the fifth disposition the member $G_5$ is disposed behind the eye piece 209 and the light receiving member $P_5$ toward the end of the member $G_5$. Although hereby it is feared that an undesired beam coming from the eye piece 209 and advancing to the pentaprism should bring an inferior influence, this harmful beam can be avoided by making the interference fringe of the direction selective diffraction element three dimensional.

In the sixth disposition the member $G_6$ is disposed on the reflecting plane of the mirror 203. The light receiving member $P_6$ is disposed in such a manner that the member $P_6$ is opposed to the end plane of the member $G_6$ when the mirror 203 is inclined. In the present case the member $G_6$ swings together with the mirror 203, so that it is desired that the member $G_6$ consists of as light a material as possible. Hereby an obliquely secured half mirror can also be applied.

In the seventh disposition the member $G_7$ is disposed in front of the image plane 204 and the light receiving member $P_7$ opposed to the end plane of the member $G_7$.

In the present case it is possible to carry out the light measurement even during the exposure of film.

Figure 25:
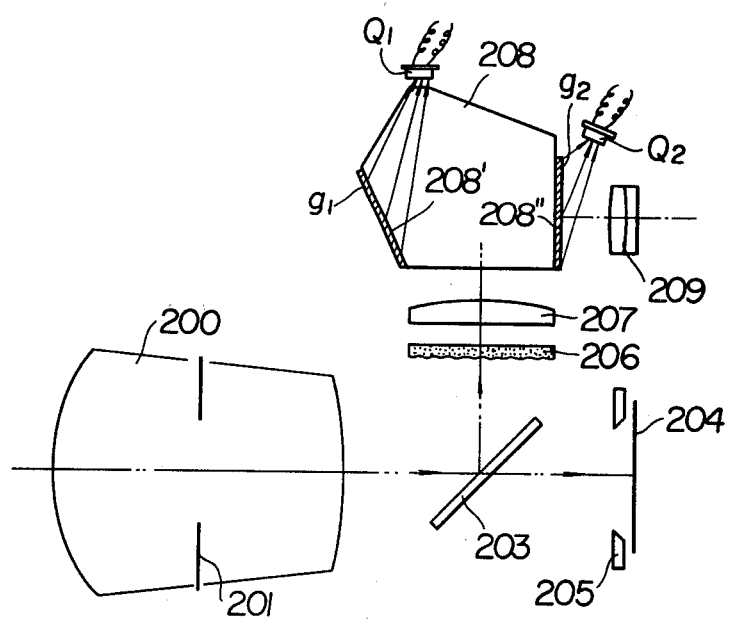
FIGS. 25 and 26 respectively show further another embodiment according to the present invention applied in a single reflex camera.
Figure 26:
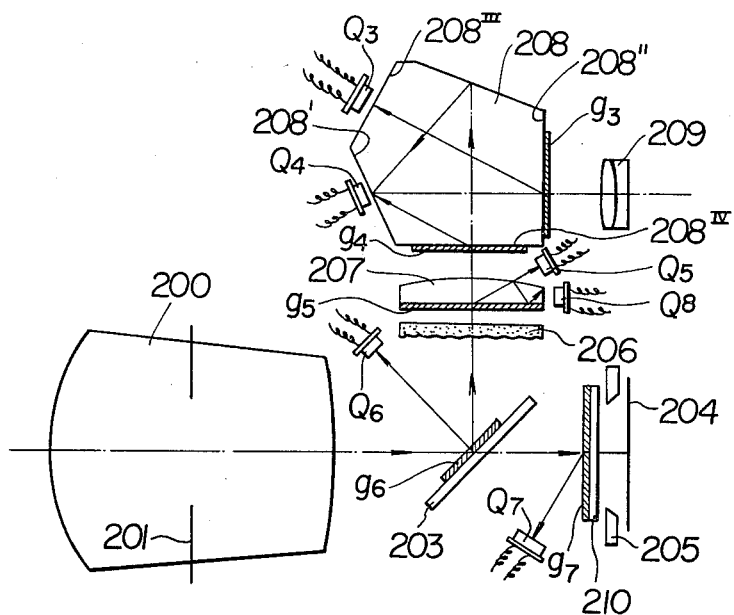

FIG. 25 and FIG. 26 relate the case that instead of disposing a light transmitting member such as plane glass plate the beam diffracted by the diffraction grating structure is led into the light receiving member. Below the disposition in a single reflex camera will be explained.

In the first disposition a diffraction grating structure of reflection type $g_1$ is formed outside of the effective reflecting plane of the front reflecting surface 208' of the pentaprism 208. Hereby the light receiving member $Q_1$ is disposed at the position at which the front upper plane and the roof plane of the pentaprism cross with each other. The position of the light receiving member is not limited to that shown in the drawing, whereby any position will do so far as the beam diffracted by the diffraction grating structure reaches and the finder effective beam is not badly influenced.

When hereby the finder beam reflected in the pentaprism 208 enters into the diffraction grating structure $g_1$, the beam is diffracted, at the same time given a convergent tendency and condensed on the light receiving surface of the light receiving member $Q_1$.

In the second disposition a diffraction grating structure $g_2$ of penetration type is formed on the exit surface 108'' of the pentaprism and the light receiving member $Q_2$ is disposed nearly above the eye piece 109. Hereby the light receiving member may be disposed either below the eye piece or right or left thereto.

Hereby the finder beam advancing toward the eye piece entered into the diffraction grating structure $g_2$, whereby the diffracted beam is condensed on the light receiving surface of the light receiving member $Q_2$ while the beam with the 0-th order passes through the diffraction grating structure $g_2$ and enters into the eye piece 209.

In the third disposition the diffraction grating structure $g_3$ of the reflection type is formed on the exit surface 208'' of the pentaprism, while the light receiving member $Q_3$ is disposed in the neighbourhood of the front upper surface 208$^{III}$.

In the fourth disposition a diffraction grating structure $g_4$ of reflection type is formed on the floor surface of the pentaprism, while the light receiving member $Q_4$ is orientated toward other spot than the effective reflecting surface of the front reflecting surface 208'.

In the fifth disposition a diffraction grating structure $g_5$ of reflection type is formed on the plane surface of the condensor lens 207, while the light receiving member $Q_5$ is disposed in the neighbourhood of the upper part of the condensor lens 207.

In the sixth disposition, a diffraction grating structure $g_6$ of reflection type is formed on the reflecting surface of the mirror 203, while the light receiving member $Q_6$ is disposed outside of the spot which the photographing beam and the finder beam pass through.

In the seventh disposition a diffraction grating structure $g_7$ of reflection type is formed on the surface of a transparent solid body 210 provided perpendicular to the optical axis of the photographing lens 200, while the light receiving member $Q_7$ is disposed outside of the photographing beam.

The eighth disposition is similar to the fifth, whereby the light receiving member $Q_8$ is disposed at the end of the condensor lens 207. The diffracted beam propagates in the condensor lens being totally reflected and enters into the light receiving member.

The application of the present invention to the marked range finder will be explained below.

Figure 27:
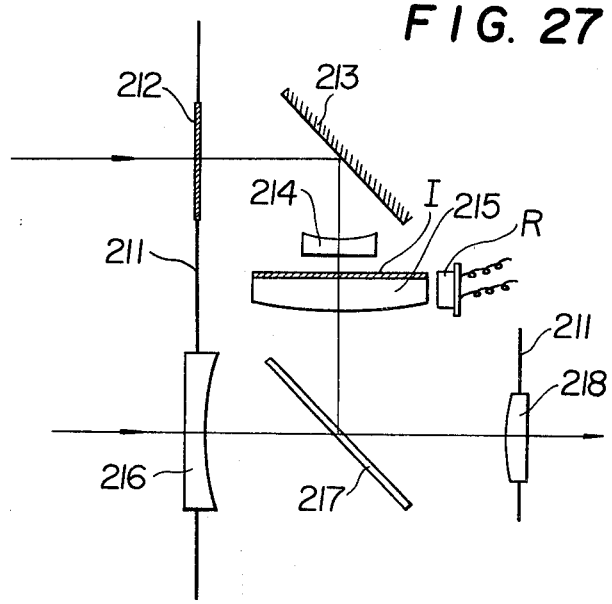
FIG. 27 shows a disposition applied in a marked range finder according to the present invention.

In FIG. 27, 212 is a window with mark while I is a diffraction grating structure provided on the plane surface of a condensor lens 215. R is the light receiving member, which is provided so as to be directed toward the end of the condensor lens 215. 216 is an objective, 217 a half mirror and 218 an eye piece. The beam coming from the object and entering into the window 212 is reflected on the mirror 213, passes through the lens 214 and reaches the condensor lens 215. The beam is diffracted by the diffraction grating I, whereby the diffracted beam with 1-st order advances toward the light receiving member R while the diffracted beam with 0-th order passes through the condensor lens 215. Hereby the beam diffracted by the diffraction grating I with 1-st order is either transmitted in the condensor lens totally reflected to the light receiving member, or condensed on the light receiving member directly from the diffraction grating I or led to the light receiving member along the diffraction grating I.

Hereby the diffracted beam with 0-th order having passed through the condensor lens 215 is combined on the half mirror 217 with the beam having passed through the objectives 116 and reaches the observer out of the eye piece 218.

Figure 28:
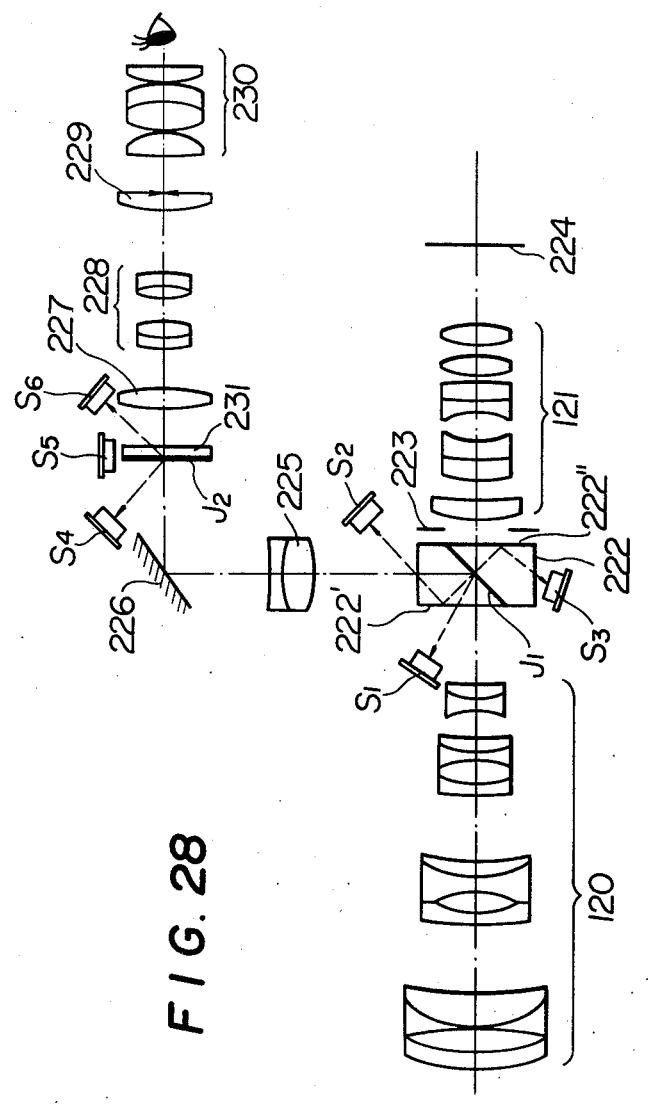

FIG. 28 and FIG. 29 respectively show the light measuring optical system of the cine camera or the television camera. In the drawngs 220 is the zoom lens part, 221 the relay lens, 222 the beam splitter, 223 the diaphragm and 224 the image plane. Further 225 is the objective of the finder, 226 the mirror, 227 the field lens, 228 the erector, 229 the condensor lens and 230 the eye piece.

In the first disposition the diffraction grating structure is formed on the surface of the half mirror in the beam splitter 222. Hereby the diffracted beam with 1-st order diffracted by the diffraction grating structure is either condensed on the light receiving member $S_1$ or reflected on the surface 222' and led to the light receiving member $S_2$. Otherwise a diffraction grating structure of penetration type is formed, whereby the diffracted beam is reflected on the surface 222' and led to the light receiving member $S_3$. Hereby the diffracted beam with 0-th order is devided by means of the half mirror of the beam splitter 222 into two, whereby the one beam advances toward the image plane, while the other toward the finder system.

In the second disposition the diffraction grating structure $J_2$ is formed on the transparent solid body 231 provided perpendicular to the optical axis of the finder system. The diffracted beam coming from the diffraction grating reaches either the light receiving member S$_4$ or S$_5$ or S$_6$.

In the third disposition (FIG. 29) a diffraction grating structure J$_3$ of reflection type is formed on the surface of the mirror 226. Hereby the diffraction grating never give a bad influence to the field of the finder.

In the fourth disposition a transparent solid body 232 is provided perpendiculary to the optical axis between the relay lens 221 and the image plane 224, on the surface of which transparent solid body 232 a diffraction grating structure is formed. The diffracted beam with first order to enter into the light receiving member S$_8$ is transmitted in the transparent solid body 232 totally reflected or along the diffraction grating. Hereby the beam to enter into the light receiving member S$_9$ or S$_{10}$ is condensed directly from the diffraction grating.

Further 234 is a controlling means to control the diaphragm 123 by means of the out put of the light receiving member S$_8$ (or S$_9$ or S$_{10}$). Hereby it is possible to obtain an image proper to be formed on the recording system such as film or photographing tube.

The above mentioned dispositions are only the representative ones, to which the present invention can not necessarily be limited. The present invention can be applied to any position behind the photographing lens.

Further FIG. 30 shows an embodiment to carry out a light measurement at the central part and at the part near the circumference of the image plane by means of an element consisting of a combination of a light transmitting member and a diffraction grating structure. 235 is a light measurement element consisting of a plane glass plate provided with a diffraction grating on the one surface, whereby the diffraction grating is devided into two domains, namely the central domain 236 and the domain 237 near the circumference. 238, 240 and 240' are the optical fiber fluxes, which are fixed at the end planes of the element 235. The beam, which enters from the domain 236 and transmitted in the element, being totally reflected, reaches the optical fiber flux 240 or 240'. At the other end of each optical fiber flux a photo cell 239 respectively 242 is provided, while between the end plane of each optical fiber and the corresponding photo cell a shutter 241 respectively 241' is provided in such a manner that at the part near the circumferene can be switched over.

According to the present disposition the beam entering into the domain 236 respectively 237 reaches the photo cell 239 respectively 242 so that it is possible to carry out the light measurement in every domain.

It is naturally also possible to arrange so as to lead the out put of the photo cell to the electronic circuit for light measuring by means of a switch without providing shutter.

Although the above mentioned explanation is made under the supposition that the diffraction grating be such one with phase structure as of volume type produced holographically. It is also possible to apply, as diffraction element, a hologram of ±type or a direction selective diffraction grating which is already known in itself. Hereby the photo sensitive means can be provided at any suitable position in the optical instrument according to the structure of the diffraction element or of the beam transmitting member provided between the diffraction element and the photosensitive means.

Hereby as beam transmitting member optical fibers as mentioned above can be utilized beside beam integrating plate (L.G.).

Further it is to be noted as a practical problem that by means of a hologram as diffraction element not only a better diffraction efficiency can be obtained but also it is much easier to obtain a desired diffraction character, much being contribute to the reduction of the production cost as well as to the stabilization of the quality in such a manner that such compact light measuring means as has never been realized before can be offered.

What is claimed is:

1. A method for measuring varying intensities of light comprising:
    exposing an image forming optical system to the varying intensities of light and directing the light along an optical path within the system;
    receiving the varying light by one of two flat faces of a planar optical system having an end face;
    intercepting at least a section of the varying light in the path with a diffraction element whose size within the path of the light remains constant;
    diffracting the light incident on the diffraction element out of the optical path so that at least a portion of the diffracted light reaches one of the flat faces of the planar optical system at a total reflection angle;
    internally reflecting the diffracted light by the flat faces toward said end face; and
    receiving the diffracted light projected from the end face by light detecting means;
    said intercepting step including orienting the element substantially perpendicular to the optical path.

2. A method as in claim 1, wherein the image forming optical system is composed of a plurality of optical elements and the diffracting step is performed as light emerges from one element before it enters the other element.

3. A method as in claim 1, wherein the diffraction step is performed after the light emerges from the image forming optical system.

4. A method as in claim 1, wherein the image forming optical system defines a focal plane and the diffraction step is performed on the focal plane.

5. A method as in claim 1, wherein the image forming optical system defines a focal plane and the diffraction step is performed in the optical path beyond the focal plane.

6. A method for measuring portions of the light incident on an image forming optical system, comprising:
    forming an optical path with a portion of the system;
    intercepting at least a section of the light in the path with a transparent element having a plurality of diffracting parts each formed of a diffraction lattice whose size within the path of the light remains constant;
    diffracting the intercepted light in a plurality of directions separately of each other in accordance with each of said diffracting parts; and
    measuring the diffracted lights separately, by means of light detecting means, in each of the different directions,
    said intercepting step including orienting the element substantially perpendicular to the optical path.

7. A method as in claim 6, wherein the step of diffracting the intercepted light includes diffracting the light in a plurality of directions at different diffraction rates with each of said diffracting parts.

8. The method as in claim 6, wherein the diffraction step includes diffracting at least a part of the light so as to produce convergence with the diffraction lattice.

9. A method as in claim 6, wherein said diffracting parts consist of a first part and a second part completely surrounding the first part.

10. A light guide comprising:
a transparent plate having two flat faces and an end face forming a projection face, and a diffraction lattice formed on the transparent plate for diffracting light incident upon the transparent plate toward one of the two flat faces so that at least a portion of the diffracted light reaches the one of the two flat faces at a total reflection angle and so that the diffracted light is internally reflected toward the end face, said lattice covering an area less than the area of one of the faces and being surrounded on all sides within one of the faces by a non-diffracting surface and having an area less than the cross section of light to be directed thereon.

11. A light guide comprising:
a parallel planar plate having an end face, and
a diffraction lattice formed on the parallel planar plate, said diffraction lattice forming an angle at least other than a total reflection angle to the plane of the plate, and diffracting the incident light at least to one of the parallel planes at a total reflection angle and projecting the diffracted light which was totally reflected from the end face, said lattice covering an area less than the area of one of the faces and being surrounded on all sides within one of the faces by a non-diffracting surface and having an area less than the cross section of light to be directed thereon.

12. A light guide comprising:
a parallel planar sheet having parallel faces and an end face, and
a diffraction lattice on said parallel planar sheet, said diffraction lattice directing the light incident on one of the parallel faces at a non-total reflection angle toward the other parallel face at a total reflection angle and projecting the light totally reflected by the other parallel face from one of the parallel faces, said lattice covering an area less than the area of one of the faces and being surrounded on all sides within one of the faces by a non-diffracting surface and having an area less than the cross section of light to be directed thereon.

13. An apparatus for measuring portions of light incident on an image forming optical system, comprising:
a diffraction element having a transparent sheet and a diffraction lattice of predetermined size carried by the sheet, said sheet having two flat faces, said lattice being arranged to intercept at least a section of the light of predetermined size and to diffract said intercepted light out of the optical path toward one of the two flat faces at a total reflection angle so that at least a portion of the diffracted light is internally reflected toward said end face, and
light detecting means in the direction of at least a portion of the light diffracted from the optical path for measuring at least a portion of the light diffracted from the optical path.

14. An apparatus as in claim 13, wherein the diffraction lattice is formed on the transparent sheet.

15. An apparatus as in claim 13, wherein said diffraction element includes a plurality of parts having different diffraction directions, said light detecting means including a plurality of measuring means for measuring the light in each of the plurality of directions.

16. An apparatus as in claim 13, in which the diffraction lattice includes two sections each having a different diffraction rate.

17. An apparatus as in claim 13, wherein the diffraction lattice is such as to produce a converged diffraction light.

18. An optical apparatus, comprising:
an image forming optical system defining an optical path, a diffraction element of predetermined size in the optical path of the light arranged for diffracting a predetermined part of constant size, of the light incident on the image forming optical system outside of the optical path, and a light detecting means arranged in the direction of light diffracted by said diffraction element for measuring the different light, said element being surrounded by non-diffracting surfaces on all sides lying entirely within said optical path.

19. A light guide as in claim 10, further comrising a plurality of optical fibers emerging from the end face.

* * * * *